United States Patent

[11] 3,601,481

| [72] | Inventor | Arthur Kessler<br>Grossaltenstadten, Germany |
|---|---|---|
| [21] | Appl. No. | 886,674 |
| [22] | Filed | Dec. 19, 1969 |
| [45] | Patented | Aug. 24, 1971 |
| [73] | Assignee | Ernst Leitz Gmbh<br>Wetzlar, Germany |
| [32] | Priority | Dec. 23, 1969 |
| [33] | | Germany |
| [31] | | P 18 16 600.2 |

[54] SHUTTER RELEASE DEVICE FOR MOTION PICTURE CAMERAS
5 Claims, 5 Drawing Figs.

[52] U.S. Cl. ........................................... 352/169,
352/137
[51] Int. Cl. ........................................... G03b 21/38
[50] Field of Search ........................................... 352/137,
169

[56] References Cited
UNITED STATES PATENTS
3,520,598  7/1970  Murata et al. .................. 352/169

Primary Examiner—Donald O. Woodiel
Attorney—Krafft and Wells

ABSTRACT: A shutter release device in an electrically operated motion picture camera for releasing the shutter for continuous operation or for single frame exposure. The rotating camera shutter is stopped and released by a stop member actuated by a solenoid. A bistable circuit for energizing the solenoid and the camera motor is connected in line with the camera release switch and is switched in its conductive state when the release switch is closed. Means for generating one electric pulse in dependence on every shutter rotation and for conducting the pulse to the bistable circuit are provided, which pulse causes the bistable circuit to be switched in its nonconductive state, thereby deenergizing the solenoid and the camera motor. Set means are provided at the camera which may be set either to a continuous-operation-position or to a single-frame-exposure-position. In the continuous-operation-position the set means prevent the pulse from reaching the bistable circuit while in the single-frame-exposure position the pulse is conducted to the bistable circuit, switching the circuit to its nonconductive state and thereby deenergizing the solenoid and stopping the camera motor.

PATENTED AUG 24 1971

3,601,481

INVENTOR
ARTHUR KESSLER
BY
Krafft & Wells
ATTORNEYS

SHUTTER RELEASE DEVICE FOR MOTION PICTURE CAMERAS

BACKGROUND OF THE INVENTION

The invention relates to motion picture cameras, more particularly to the shutter release mechanism in cameras of the type wherein the film advance means and the rotating shutter blade are driven by an electric motor.

It is well known in this particular art to provide motion picture cameras with release means for optionally releasing the shutter for continuous operation or for single frame exposure. Further, it is already known to use a lever or pin as a stop member for the shutter blade, which stop member is positioned in the path of the shutter blade, from where it may be retracted by a solenoid and where it is brought back by the force of a spring.

While such device is without difficulties as far as continuous operation of the camera is concerned, it presents problems if the shutter is to be released for the exposure of a single frame only. Assuming that the exposure-frequency during continuous operation amounts to 18 frames per second, the time of one shutter revolution will be approximately 60 milliseconds. Now, since it cannot be expected from the operator to press and release the camera release switch or button within those 60 milliseconds, the shutter and the film advance means must be stopped automatically by an electric or an electronic device.

Such a device is already incorporated in a camera sold in the market, and it is known to comprise a monostable circuit which is connected to the circuit of the solenoid when the camera is manually set to single frame exposure. The circuit includes a resistance-capacitor-combination, hereinafter called RC-combination, which breaks the circuit of the solenoid after a preestablished time has elapsed.

There is, however, a problem connected with this device. The releasing time of a solenoid averages about 15 milliseconds and, further, there must be taken into account a time difference inherent in the monostable circuit and also a certain safety period for ensuring that the shutter and the camera motor are indeed stopped after one shutter revolution, which two periods together also amount to approximately 15 milliseconds. Consequently, the RC-combination must be designed to break the circuit of the solenoid and the camera motor 30 milliseconds after the camera shutter has been released. This means, however, that the camera motor is already deenergized after one half of the shutter revolution. The shutter is then expected to rotate through the remaining half of its path merely propelled by its kinetic energy. It is therefore impossible to guaranty uniform exposure of all single frame pictures.

It is therefore an object of the present invention to provide a shutter release device by which the moment of breaking the current supply to the solenoid and the camera motor is so precisely established that most of the safety period of 15 milliseconds can be dispensed with. Together with a solenoid having a releasing time as short as possible a shutter release device is provided wherein the moment of breaking the current supply almost coincides with the moment of actually stopping the shutter, thus greatly improving the uniform exposure of single frame pictures.

SUMMARY OF THE INVENTION

The above-stated object is attained by including the solenoid in a bistable circuit. The solenoid is energized when the camera release switch is closed and the bistable circuit is in its conductive state, this being the case during normal continuous camera operation. Further, there are means provided for generating electric pulses, one pulse with every rotation of the camera shutter. Set means are also provided at the outside of the camera housing for setting the camera either to continuous operation or to single frame exposure. If these means are set to single frame exposure the generated pulses are conducted to the bistable circuit, causing the latter to be switched in its nonconductive state, thereby breaking the current supply to both, solenoid and motor. If the set means, however, are set to continuous operation the pulse conducting line is opened so that the pulse is prevented from switching the bistable circuit to its nonconductive state. The latter remains in its conductive state and, consequently, the motor and the solenoid are not deenergized and the camera continues to operate.

The bistable circuit may be a transistorized bistable flip-flop circuit, however, it may also be a solenoid with a locking contact. These different means require slightly different circuitries. It is, however, common to both embodiments that the pulse for switching the bistable circuit to its nonconductive state for single frame exposure is generated by means of the shutter itself so that stopping the shutter occurs at a positively controlled moment and not in dependence on a RC-combination being set to a preestablished time, as in prior art devices.

BRIEF DESCRIPTION OF THE DRAWINGS

Further details of the invention will be apparent and fully comprehended from the following description when taken in conjunction with the appending drawings, wherein.

DESCRIPTION OF THE PREFERRED EMBODIMENTS

Figure 1:
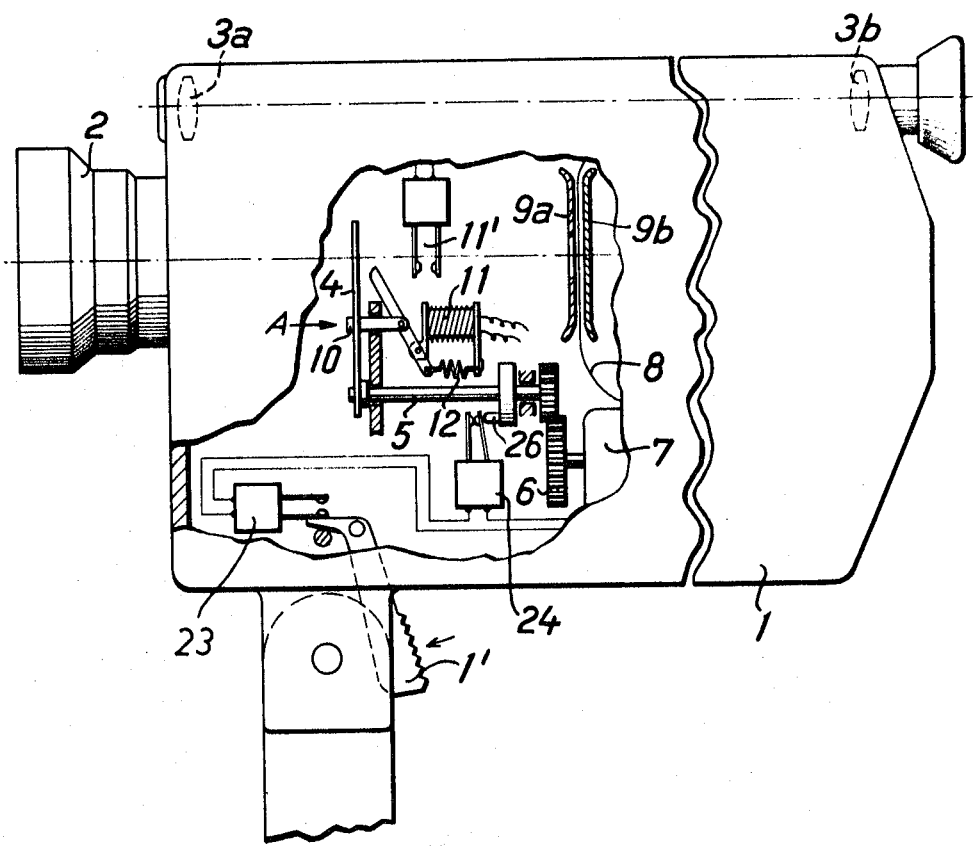
FIG. 1 shows schematically a motion picture camera comprising a solenoid and a stop member and a pulse generating switch in combination with a rotating shutter.

Referring now to the drawings, the motion picture camera shown in FIG. 1 is provided with a picture taking lens 2. The camera is further provided with a viewfinder 3a, 3b, and in the camera housing 1 a shutter 4 is arranged on a shaft 5. The latter is rotated by an electric motor 7 through a gear train 6. A film is guided between an image aperture plate 9a and a pressure plate 9b. The supply reel and the takeup reel as well as the film advance means are not shown, for sake of simplicity.

In the path of the rotating shutter 4 there is arranged a stop member 10 which is retractable in the direction of arrow A for releasing the camera shutter. The stop member 10 is linked to the pallet of a solenoid 11, the latter being attracted against the force of a spring 12 when the solenoid is energized.

Figure 2:
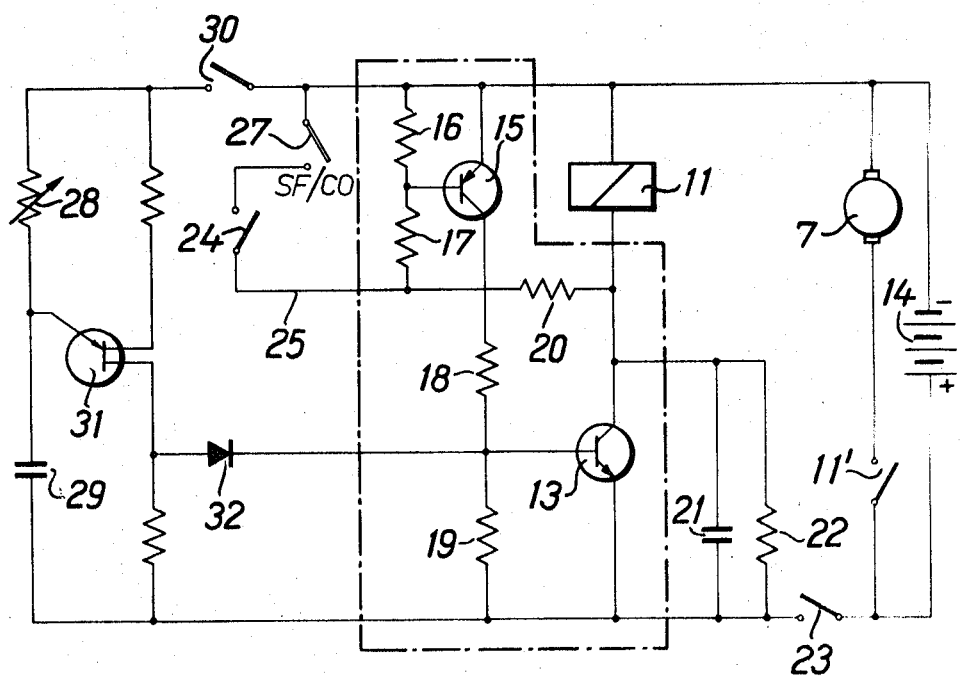
FIG. 2 shows the circuit of a shutter release device wherein the bistable circuit is a transistorized flip-flop and wherein the means for preventing the conduct of the pulses to the bistable circuit is a switch which separates the pulse generating switch from the power source.

In the first embodiment of the invention, the circuit of which being shown in FIG. 2, the solenoid 11 is included in the emitter/collector circuit of a transistor 13 in line with the power source 14. The solenoid has a relay contact 11' in series with the motor 7, the motor circuit, therefore, being closed when the solenoid 11 is energized.

The transistor 13 and a transistor 15 together with resistors 16, 17, 18, 19, 20 form a bistable flip-flop, which in FIG. 2 is enclosed by the dash-dot line. Parallel to the emitter/collector circuit of the transistor 13 there is connected a capacitor 21. The flip-flop, together with the capacitor 21 and the solenoid 11, is in series connection with the shutter release switch 23 and the power source 14.

The set means for setting the camera either to continuous operation or to single frame exposure is a switch 27 (in the embodiment shown in FIG. 2) which may be switched to a position marked "CO" (=continuous operation) or "SF" (=single frame). The switch 27 is on one side connected to the power source 14 and on the other side to a pulse generating switch 24, the latter being on the other side connected to the bistable flip-flop by means of a wire 25. The pulse generating switch 24 therefore affects the feedback circuit of the flip-flop. From FIG. 1 it will be apparent that the pulse generating switch 24 is engaged by a pin 26, mounted on a shoulder of shaft 5 of the shutter 4. Switch 24 is therefore closed once upon every shutter revolution.

By closing both the set switch 27 and the pulse generating switch 24 the feedback circuit of the flip-flop may be shortened. The switch 27 can, of course, be adjusted from the outside of the camera by means of a knob or a handle. The two positions to which it may be adjusted are clearly marked "CO" and "SF", the switch 27 being closed when the handle is set to the SF-marking.

The device illustrated in FIG. 2 functions in the following manner:

The two transistors 13 and 15 of the bistable flip-flop are both at the same time either conductive or nonconductive, and the solenoid 11 will only be energized if the shutter release switch 23 is closed and the transistors 13, 15 are in their conductive state.

Whenever the shutter release switch 23 is closed capacitor 21 will be charged through the resistors 17, 20. This causes the two transistors 13, 15 to become conductive, as a consequence whereof the solenoid 11 is energized. The pallet is attracted and pulls the stop member 10 out of the path of the shutter 4. At the same moment the solenoid contact 11' is closed. Thereby, current is supplied to motor 7 which begins to run continuously, when it is assumed that switch 27 is set to continuous operation, i.e. when switch 27 is open.

When the shutter release 1' (FIG. 1) is let free switch 23 is again opened and the capacitor 21 is discharged in a very short period of time across the resistor 22. Thereafter, the camera is ready for the next shutter release. Besides the function just described it is also the purpose of the capacitor 21 to limit the breaking voltage of the solenoid 11.

For performing single frame exposure the handle or knob operating the set switch 27 must be set to the SF marking, thereby closing switch 27. Now, the pulse generating switch 24 becomes effective. Closing of the shutter release switch 23 causes the solenoid 11 to become energized, as described above. During the first revolution of the shutter 4 and the shaft 5 the pulse generating switch 24 is closed by the pin 26. Thereby, the feedback circuit is shortened which causes the transistors 13, 15 to become nonconductive, so that the solenoid is deenergized. Actuation of the pulse generating switch 24, i.e. closing the latter by pin 26 and again opening it, occurs prior to the end of the first shutter revolution. After this revolution has been completed the device is ready for the next single frame exposure.

It is, however, emphasized that actuation of the pulse generating switch 24 occurs during every run of the camera, be it continuous operation or single frame exposure. But since the set switch 27 is not closed during continuous operation the switch actuation remains without any effect while filming normally.

The device schematically illustrated in FIG. 2 is further provided with a timing mechanism for automatically conducting a pulse to the flip-flop. The timing mechanism functions only when the shutter release switch is kept closed, for example by special locking means not shown, and when the set switch 27 is also closed. It is a purpose of the timing mechanism to shoot automatically a sequence of single frame exposures at preestablished time intervals. The pulse conducted to the flip-flop switches the transistor 13 to its conductive state in exactly the same manner as if the pulse would originate from individually closing the shutter release switch 23, The timing mechanism comprises a RC-combination of known design including a variable resistor 28 and a capacitor 29. One side of the combination is constantly connected to the power source 14, while the other side is connected to the power source by way of a switch 30. The latter may be closed and opened by means of an adjusting lever (not shown) which is accessible on the outside of the camera housing.

The potential of the RC-combination is supplied to the base of a transistor 31. In the emitter/collector circuit of this transistor there is connected a diode 32 through which the pulse is conducted to the transistor 13, at intervals which may be preselected by adjusting the variable resistor 28. The solenoid 11 which is energized as a result of the pulse switching the flip-flop to its conductive state, is deenergized by the feedback circuit after one shutter revolution and is then again energized by the next pulse from the timing mechanism.

Figure 3:
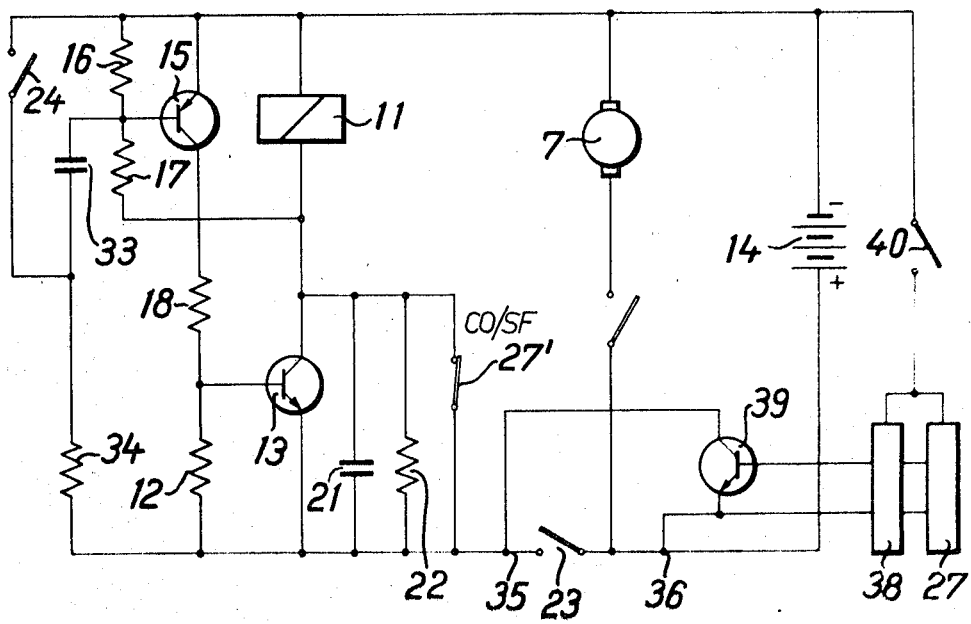
FIG. 3 shows the circuit of a shutter release device wherein the bistable circuit is a transistorized flip-flop and wherein the means for preventing the conduct of the pulses to the bistable circuit is a switch connected in parallel to the bistable circuit.

In FIG. 3 there is shown a similar circuit of a shutter release device as is illustrated in FIG. 2, however, the feedback circuit is designed differently. Further, the set switch and the timing mechanism are connected differently. It should be noted, however, that the set switch and the timing mechanism of FIG. 3 may readily be incorporated in the circuitry shown in FIG. 2.

The pulse generating switch 24 is in FIG. 3 connected to the base of transistor 15 through the capacitor 33, the latter being connected on the other side to the power source 14. As a consequence thereof, the pulse generating switch 24 can remain closed beyond the stopping position of the shutter 4, contrary to the embodiment shown in FIG. 2. The switch 24 must, during one shutter revolution, only be opened long enough for the capacitor 33 to become charged across the resistor 34 for the next stopping pulse.

Further, contrary to the embodiment shown in FIG. 2 in the circuit of FIG. 3 the pulse generating switch is constantly connected to the power source. The set switch 27' is in FIG. 3 in series connection with the shutter release switch 23 and the solenoid 11. When the handle operating switch 27' is set to continuous operation switch 27' is closed, thereby providing a direct line between the shutter release switch 23 and the solenoid 11. Regardless of this connection the flip-flop keeps switching from its conductive state to its nonconductive state, however, this function remains without effect on the shutter release and on the continuous operation of the camera.

Further, in the embodiment of FIG. 3 a remote control device may in a known manner be connected to the points 33 and 36, which device will then be connected in parallel to the shutter release switch 23. However, differing from the embodiment shown in FIG. 2 the points 35 and 36 may also be used to connect a timing mechanism 27. The pulse generated by this timing mechanism is conducted to a monostable flip-flop 38 which extends the pulse so that it will be longer than one shutter revolution. The extended pulse is then supplied to the base of a transistor 39, the emitter/collector circuit of which bridges the shutter release switch 23. For starting the timing mechanism the switch 40 is closed, thereby connecting the mechanism with the power source.

Figure 4:
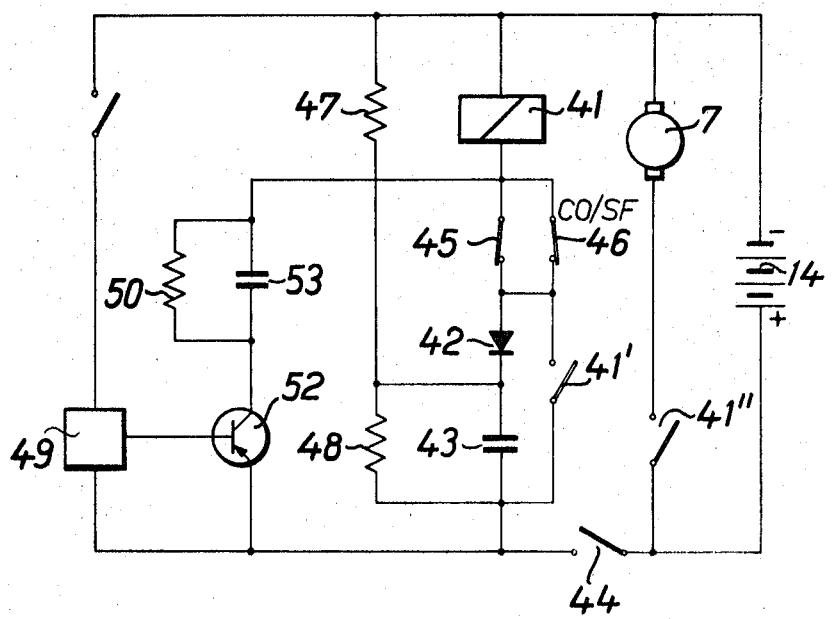
FIG. 4 shows the circuit of a shutter release device wherein the bistable circuit is a solenoid having a locking contact, and wherein the means for preventing the conduct of the pulses to the bistable circuit is a switch connected in parallel to the pulse generating switch.
Figure 5:
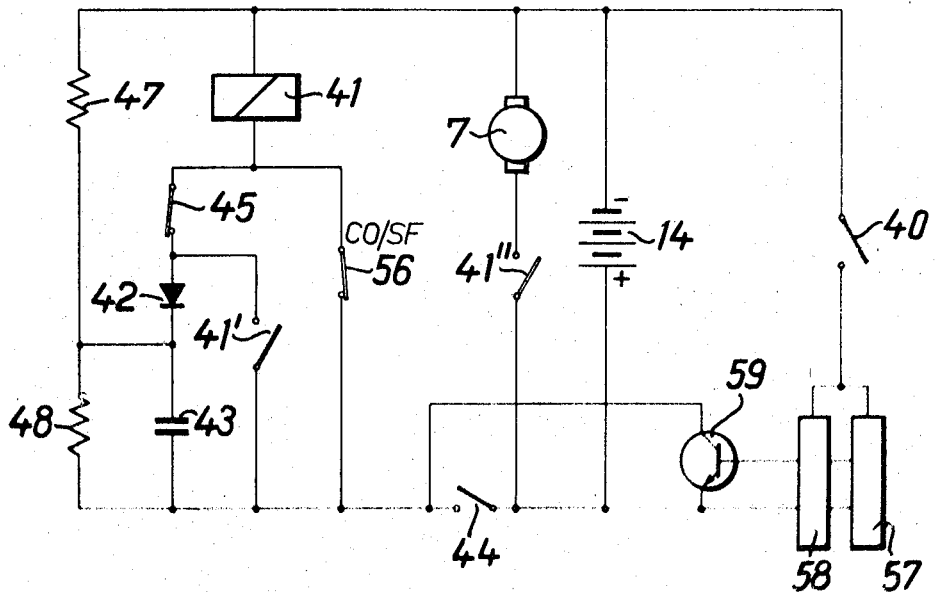
FIG. 5 shows the circuit of a shutter release device wherein the bistable circuit is a solenoid having a locking contact, and wherein the means for preventing the conduct of the pulses to the bistable circuit is a switch connected in series with the camera release switch and the solenoid.

In the FIGS. 4 and 5 there is illustrated a second embodiment of the invention wherein a solenoid 41 with a locking contact 41' is used as a bistable circuit. In series with these elements are connected the shutter release switch 44 and the pulse generating switch 45, the latter being shunted by the set switch 46. If switch 46 is set to continuous operation and the shutter release switch 44 is closed the capacitor 43 is charged by way of the resistor 47 and the solenoid 41 which is thereby energized. The locking contact 41' is thus closed, and a second solenoid or relay contact 41" in the motor circuit is also closed. As a consequence thereof, the camera will operate. Since the pulse generating switch 45 is shunted by the closed switch 46 the opening and closing of the pulse generating switch 45 remains without any effect on the continuous camera operation.

If the knob or handle on the camera housing is set to single frame exposure set switch 46 will be opened. Upon closing the shutter release switch 44 the solenoid 41 is again energized as described before, however, it will now be deenergized prior to the completion of the first shutter revolution on account of the pulse generating switch 45 being opened for a short period of time by the pin 26. At the end of the first shutter revolution the set switch 45 is already closed again. The fact that no further shutter release occurs now—the shutter release switch 44 still being closed—is due to the capacitor 43 which is still charged. Only when the release switch 44 is opened the capacitor 43 will become discharged, whereby the whole bistable circuit is switched to a state wherein the next single frame exposure is possible.

FIG. 4 shows a timing mechanism 49 which is connected to the bistable circuit in the manner already illustrated in FIG. 2 and described in connection therewith. In FIG. 4 the pulse generated by the timing mechanism is conducted to the transistor 52. When the latter becomes conductive on account of such a pulse the capacitor 53 is charged through the solenoid 41. The solenoid is thereby energized—the shutter release switch 44 being closed—and locks itself by means of the locking contact 41'. When, later, the pulse generating switch 45 is opened for a short period of time the capacitor 53 is already charged or the pulse period through the transistor 42 is already finished so that no more current flows through the capacitor 53. The solenoid 41 is therefore deenergized. At the end of a pulse the capacitor 53 is discharged by way of the resistor 50 and is then ready for the next single frame exposure.

In FIG. 5 there is illustrated a modification of the embodiment of the invention shown in FIG. 4. In FIG. 5 the set switch 56 for setting the camera to continuous operation or to single frame exposure is not only in parallel connection to the pulse generating switch 45, but to the whole bistable circuit. The function as regards the continuous operation and the single frame exposure, however, remains unchanged from the embodiment shown in FIG. 4.

The timing mechanism connected to the circuit in FIG. 5 is the same as shown in FIG. 3. From the timing mechanism proper 57 a transistor 59 is controlled by way of a monostable flip-flop 58. The transistor 59 is connected in parallel to the shutter release switch 44. The pulses generated by the timing mechanism 57 are extended by the flip-flop circuit beyond the end of the shutter revolution. They are, however, shorter than the selected pulse frequency.

What I claim is:

1. A shutter release device in a motion picture camera of which the rotating shutter means and the film advance means are driven by an electric motor for optionally releasing the shutter for continuous operation or for single frame exposure, the device comprising:
   a. a stop member (10) for stopping and releasing the rotating shutter;
   b. an electric camera release switch (23);
   c. a bistable circuit in line with said camera release switch, said circuit being switched to its conductive state when said camera release switch is closed;
   d. a solenoid (11) for withdrawing said stop member from said shutter and thereby releasing the latter when said solenoid is energized, said solenoid being only energized when said camera release switch is closed and said bistable circuit is in its conductive state;
   e. means (24, 26) for generating and conducting one electric pulse to said bistable circuit in dependence on every revolution of said shutter; and
   f. set means (27) for optionally setting said device to continuous operation or to single frame exposure, said set means being functionally connected to said pulse generating means so that said generated pulse switches said bistable circuit to its nonconductive state when said set means are set to single frame exposure, while said pulse is prevented from switching said circuit to its nonconductive state when said set means are set to continuous operation.

2. A shutter release device as claimed in claim 1, wherein said bistable circuit is a bistable flip-flop comprising two complementary transistors (13, 15) which are both at the same time conductive or nonconductive, and a capacitor (21) which switches said transistors to their conductive state when said camera release switch is closed, said capacitor being connected to the output side of said flip-flop for limiting the breaking voltage of said solenoid;
   wherein said means for generating one electric pulse in dependence on every shutter revolution is a pulse switch (24) which is closed once upon every shutter revolution and which shortens the base circuit on one of said two complementary transistors (15);
   and wherein said switching means for optionally setting said device to continuous operation or to single frame exposure is an electric switch (27) which in its "continuous operation" position separates said pulse switch from the power source.

3. a shutter release device as claimed in claim 1, wherein said bistable circuit comprises a locking contact (41') in connection with said solenoid (41), a diode (42) and a capacitor (43) in parallel to said locking contact and further a first resistor (47) which permits charging of said capacitor when said locking contact is closed, and a second resistor (48) by means of which said capacitor is charged when said camera release switch (44) is opened;
   wherein said means for generating one electric pulse upon every shutter rotation is a closed switch (45) in line with said solenoid (41), which switch is opened upon every shutter rotation;
   and wherein said switch means for preventing switching of said bistable circuit to its nonconductive state is a bridging contact (46) parallel to said closed switch (45); said contact (46) being functionally connected to said set means for setting said device to continuous operation or to single frame exposure and being closed when said set means is set to continuous operation.

4. A shutter release device as claimed in claim 1, and further comprising a timing mechanism (27) for conducting pulses at preset time intervals to the bistable circuit, said pulses being shorter that the period of one shutter revolution, thereby switching said circuit to its conductive state when said device is set to single frame exposure and said camera release means are actuated.

5. A shutter release device as claimed in claim 1, and further including a timing mechanism (57) comprising an output transistor (39, 59) of which the emitter/collector circuit is parallel to the camera release contact, the timing mechanism generating and conducting pulses at preset time intervals to the bistable circuit when the device is set to single frame exposure and said camera release means are not actuated, said pulses being longer than the period of one shutter revolution.